United States Patent Office 3,532,772
Patented Oct. 6, 1970

3,532,772
ALKALI METAL PHOSPHIDE-ALKYLENE POLYAMINE ADDUCTS AS INITIATORS IN CONJUGATED DIENE AND VINYL ARENE POLYMERIZATION PROCESSES
Harold de la Mare, El Cerrito, and Friedrich E. Neumann, Alameda, Calif., assignors to Shell Oil Company, New York, N.Y., a corporation of Delaware
No Drawing. Filed July 30, 1968, Ser. No. 748,651
Int. Cl. C08f 15/00
U.S. Cl. 260—879    11 Claims

ABSTRACT OF THE DISCLOSURE

Novel block polymers are presented which are substituted with phosphino radicals and result in further novel block copolymers comprising conjugated diene or vinyl arene polymer and at least two blocks of a polymerized unsaturated polar monomer such as acrylonitrile separated by phosphino radicals.

---

This invention is concerned with novel polymerization processes. More particularly it has been found that alpha olefins can be polymerized with catalysts which are soluble in hydrocarbon media comprising the adducts formed between $C_{2-3}$ olefin polyamines and alkali metal dihydrocarbyl phosphines and allied compounds as more fully described hereinafter.

The prior art is replete with catalysts and processes for the polymerization of alpha olefins. Many of the catalysts employed are suitable for the formation of polymers containing nothing but carbon and hydrogen in their backbone but are useless for the formation directly of polymers terminated with certain polar radicals, namely, those incorporating phosphorus at one or both ends of the polymer molecule. Previous attempts to polymerize alpha olefins with alkali metal phosphines have found it necessary to resort to polymerization media comprising ethers such as dioxane or tetrahydrofuran, which with many monomers produces a polymer of undesirable structure. On the other hand, if it is desired to polymerize monomers in a hydrocarbon media utilizing alkali metal phosphides it will be quickly found that the catalysts are essentially insoluble in such media or are soluble to so slight an extent as to result in poorly controlled product molecular weight. This is due to the fact that the catalyst solutions are so extremely dilute and therefore contain such an amount of catalyst that any trace amounts of impurities which will react with the catalyst will drastically alter the amount of catalyst available for controlling the molecular weight of the polymerization product.

It is a desirable objective in a polymerization process especially when utilized on a commercial scale to be able to accurately measure the catalyst concentration so that the product quality may be closely controlled. It is another object of the present invention to produce a novel class of polymerization catalysts particularly useful for the preparation of certain polymers bearing substituted phosphino radical(s). Another object of the invention is to provide a process for the preparation of coupled polymers wherein at least one of the coupling members terminates with a phosphino radical. Other objects will become apparent during the following detailed description of the invention.

STATEMENT OF THE INVENTION

Now, in accordance with the present invention, a process for the polymerization of conjugated dienes or vinyl arenes in hydrocarbon media is provided wherein the alpha olefin(s) is contacted at polymerization temperatures with an initiator comprising adducts formed between chelating amines and an alkali metal phosphide of the general formula:

wherein M is an alkali metal ion, $R_1$ is a hydrocarbyl radical and $R_2$ is a radical of the group consisting of $R_1$ and

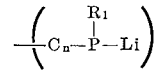

wherein $n$ is a whole integer between 1 and 20. Still in accordance with the present invention, the products resulting from the above polymerization process will have structures dependent on the initiator type. Thus, when $R_1$ and $R_2$ are hydrocarbyl radicals, the polymers are terminated on one end of each polymer chain with a phosphino radical. This latter, in turn, may be utilized in further polymerizations as referred to hereinafter. In further accordance with the present invention, it has been found that the chelating amine adducts of the alkali metal phosphides not only are excellent catalysts for the preparation of polymers having highly desirable structure and cause a rapid rate of polymerization but also result in polymers especially suitable for use in the formation of block copolymers and the like. On the other hand, however, they may be utilized in the formation of homopolymers or random copolymers.

On the other hand, internally positioned phosphino radicals result from the use of initiators wherein $R_2$ represents the radical

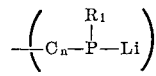

Furthermore, polymers resulting from the first alternative may be coupled to form coupled products bearing phosphino radicals as all chain terminals.

The alkali metal phosphides which are preferred may have the general structure:

wherein M is an alkali metal radical and $R_1$ and $R_2$ are both hydrocarbyl radicals. However, it is also possible to form difunctional catalysts by replacing one of the hydrocarbyl radicals with a radical having the general configuration

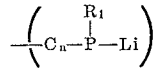

in the latter case the subscript $n$ stands for a whole integer between 1 and 20. The proportion of alkylene polyamine used to form an adduct with the phosphides generally is between about 1 and 10 equivalents per equivalent of phosphide. However, this may be varied as desired consistent with the principal objective of obtaining a hydrocarbon-soluble catalyst and one which is active for the intended purpose of alpha-olefin polymerizations. Thus the proportion of alkylene polyamine will vary not only with the identity of the phosphide but also with the identity of the alkylene polyamine and the hydrocarbon medium in which the polymerization is to be carried out. Preferably, the amount of alkylene polyamine employed is between 2 and 5 moles per equivalent of phosphide. This is especially true when the phosphide is a lithium dihydrocarbyl phosphide and the alkylene polyamine is a tetrahydrocarbyl ethylene diamine. In general, the lithium phosphides are especially preferred for use in the process of this invention. However, for special purposes, it is possible to utilize the corresponding sodium, potassium, caesium or rubidium phosphides. The hydrocarbyl groups forming a part of the essential phosphide structure may be aliphatic, cycloaliphatic, naphthenic or aromatic but preferably are aliphatic radicals having from 1 to 8 carbons each including methyl, ethyl, propyl, butyl, hexyl and octyl radicals although naphthyl, benzyl, phenyl and similar radicals may be utilized. The preparation of organic phosphides and bisphosphides is well known. In a preferred method, the organic especially dialkyl phosphine is treated with an alkali metal alkyl to produce the corresponding alkali metallo dihydrocarbyl phosphide. It will be found that these are usually white solid materials which are insoluble in hydrocarbons and are practically useless for the commercial polymerization of alpha olefins due to this fact. It is only after they have been solubilized by adduct formation with the subject class of alkylene polyamines that they may be readily employed for the closely controlled polymerization of alpha olefins.

The adducts are readily formed at room temperature by simply contacting the phosphide with a hydrocarbon solution containing the desired ratio of a chelating amine such as alkylene polyamines, heterocyclic amines such as sparteine, or hydrocarbyl amines. The alkylene polyamines which may be utilized for the present purpose are restricted to those in which the alkylene unit contains either 2 or 3 carbon atoms separating 2 amino radicals and in which each amino radical bears no hydrogen substituents. While monomeric alkylene amines may be used, it is also possible to utilize those having 1 to 10 alkylene radicals each separated from the next by an amino group. Thus while the preferred species is tetramethyl ethylene diamine, it is also possible to utilize the higher species such as tetrapropyl propylene diamine as well as species such as pentamethyl diethylene triamine and the like.

The proportion of amine to phosphide may be varied over a relatively wide range although it is preferable to restrict the amount of amine to that which is minimum for solubilizing the particular phosphide in the hydrocarbon polymerization medium. Thus, in the case of lithiodiethylphosphide and when utilizing cyclohexane as the polymerization medium, it has been found that solubilization at polymerization temperatures is attained when about 3 moles of tetramethyl ethylene diamine is employed per mole of the phosphide. It will be obvious that the minimum amount required for solubilization will vary as referred to hereinbefore with the identity of the phosphide, of the hydrocarbon polymerization medium and with the polyamine utilized.

The soluble catalyst may be used in polymerization of monovinyl arenes such as styrene or alpha-methyl styrene and for the polymerization of conjugated dienes such as butadiene and isoprene. It is possible to effect random copolymerization as well as block polymerization when utilizing these catalysts. The proportion of catalyst will vary inversely with the desired average molecular weight of the product.

One of the special and important uses of the present catalyst is in the formation of block copolymers. Thus, it is possible to first polymerize a conjugated diene such as butadiene to form a polymer block terminated on one end with a lithium radical and on the other with a phosphino radical and thereafter introduce a monovinyl arene such as styrene into the system, continuing polymerization to form a two-block copolymer terminated on the growing end of the block polymer chain with lithium radical and on the opposite end with the phosphino radical and thereafter introduce a coupling agent containing at least one and preferably two or more sites capable of reacting with a carbon to metal bond of the polymer thereby coupling at least two of the polymer chains. This may result in either linear or non-linear coupled block polymers. Suitable coupling agents for this purpose include halogens, dihaloalkanes, dihaloalkenes, diesters formed between dicarboxylic acids and monohydric alcohols, trifunctional coupling agents and the like. This results in coupled block copolymers containing at two or more points with phosphino radicals which in turn may be utilized for the formation of further derivatives or higher molecular weight block copolymers by reaction with suitable functional groups.

The hydrocarbon medium utilized in the polymerization process of this invention will depend largely on the solubility of the monomer, polymer and catalyst therein. The hydrocarbon medium therefore may comprise a single hydrocarbon or a mixture thereof and these may be alkanes, alkenes, cycloalkanes, cycloalkenes and aromatics. Preferably the hydrocarbon medium includes particularly hydrocarbons having between 3 and 8 carbon atoms per molecule. More particularly, these comprise butenes, butanes, pentanes, hexanes, cyclohexanes, benzene and mixtures thereof. Cyclohexane is a preferred solvent particularly where the first monomer present in the system is a monovinyl arene such as styrene. When the first monomer to be polymerized is a conjugated diene, then it is preferred to utilize alkenes such as mixed pentenes or alkanes such as mixed pentanes. If block copolymers are to be formed between conjugated dienes and monovinyl arenes, then mixtures of alkenes or alkanes with a cycloalkane such as cyclohexane are preferred.

One aspect of the present invention is the observation that the use of the soluble catalyst enables rapid polymerization in a hydrocarbon medium. This is sharply contrasted to the prior art catalyst comprising phosphides unmodified with chelating amines wherein the latter catalyst are not soluble in hydrocarbons. It is found that while polymerization occurs in a hydrocarbon medium, the reaction was extremely slow and took as much as one month to complete at room temperature. It is obvious that such a process is uneconomical and would never be commercially feasible. If a choice is available for polymerization with a soluble catalyst which in turn results in relatively rapid polymerization rates.

One special application of phosphido terminated polymers is in the block polymerization therewith of polar monomers such as acrylic esters, acrolein, alkyl vinyl ketones, nitro-olefins, acrylic nitriles and lactones. It has been found that the phosphino substituents on such polymers will actually act as initiators for block polymerization with polar monomers. This may occur when only one of the terminals is a phosphino radical but more preferably it is contemplated that a conjugated diene polymer block is terminated on at least two sites, preferably terminals, with phosphino radicals. It is then possible to cause the polar monomers such as methyl methacrylate, etc. and their homologs and analogs to block polymerize on both of these sites to form thermoplastic polymer blocks resulting in what may be regarded as a thermoplastic elastomer. By this is meant a block copolymer which exhibits the physical properties of a curved or vulcanized elastomer without actually having been vulcanized but which may be processed above its softening point in thermoplastic processing equipment such as extrusion apparatus or other thermoforming equipment. Thus this provides a ready route to the formation of such block copolymers. Furthermore, due to the polar character of these polymers they exhibit improved adhesion to polymeric polar surfaces such as present in cellulose and cellulose derivatives and the like.

In accordance with one aspect of the present invention, novel polymers are provided having the general configuration:

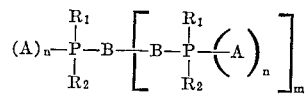

wherein B is a conjugated diene or vinyl arene polymer block, $m$ is an integer from 1 to 5 and each R is an independently selected hydrocarbyl radical, $n$ is a whole number of 0–1 and A is a polymer block of an unsaturated polar monomer copolymerizable therewith. It will be seen according to the above general formula that the phosphino terminated polymers may be either homopolymers, random copolymers or preferably block copolymers. When the integer $n$ is 0 then the general formula becomes the preferred polyterminated polymer and has the following configuration:

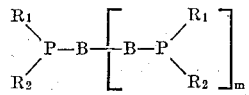

In may instances it is sufficient to have a diterminated polymer which then may be represented by the following general configuration:

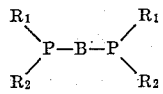

In this case it will be seen that the polymer unit B is represented as being essentially linear while in the preceding examples the polymer unit B may be coupled in such a way as to be either linear or non-linear, i.e., branched, star-shaped or radial as well as grafted. More specifically, a preferred polyterminated polymer which may be used for further reaction will have the general configuration:

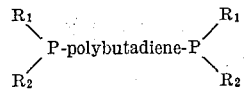

As intimated hereinbefore, phosphino terminated polymers may be utilized as initiators for the formation of block copolymers with copolymerizable polar unsaturated monomers. A typical case is the block copolymerization of acrylonitrile with phosphino substituted polybutadiene. A typical block polymer of this type must be represented as follows:

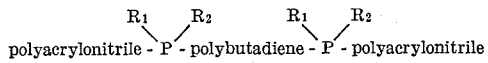

In all of the above formulae it will be understood that the molecular weight of the individual blocks may be varied within any desired limits, the invention in this case being the utilization of the phosphino substituted polymer as an initiator for block copolymerization with unsaturated polar monomers. The phosphino substituted homopolymers of conjugated dienes may be prepared by routes other than by the use of lithiodihydrocarbyl phosphine adducts with chelating amines. For example, they may be synthesized by polymerizing butadiene or other conjugated diene with a dilithium initiator to form a dilithio terminated polybutadiene which is then reacted with a dihydrocarbyl halophosphine. This results in replacement of the lithium radicals with dihydrocarbyl phosphino radicals wich may then be utilized as an initiator as described above.

The following examples illustrate the process and products of the present invention.

EXAMPLE I

Lithiodiethylphosphide was synthesized by reaction of diethylphosphine with secondary butyl lithium in cyclohexane solution. The white soluble phosphide is soluble in cyclohexane only to the extent of less than 0.0013 molar; consequently, it precipitated as a white solid and was washed and redissolved in cyclohexane containing about 10% by volume of tetramethyl ethylene diamine. The 0.67 molar solution of tetraethylene diamine dissolved the phosphide to give a 0.23 molar solution of the phosphide in the form of a phosphide:diamine complex. The complex was utilized in polymerizing butadiene and in the course of the polymerization showed excellent activity and chain life times as observed in the data summarized below:

CONDITIONS

Run A: Butadiene, 1.74M; Complex, 3.15×10⁻³M.
Run B: Butadiene, 1.61M; Complex, 2.96×10⁻³M.

| Sample | Time (min.) | Temp. (° C.) | Conv. (percent) | M.W.×10⁻³ $M_p$ [1] | $M_n$ calcd. |
|---|---|---|---|---|---|
| A | 15 +45 +90 | 40-60 25 25 | 98 ---- 100 | ---- 33.4 (I.V.=0.40 dl./g.) | 29.4 30.0 |
| B | 30 +64 | 25-38 22-29 | 94 100 | ---- 31.0 (I.V.=0.37 dl./g.) | 27.6 29.4 |
| Coupled with Diethyladipate | | | | | |
| ---- | 30 +33 | 24 40-41 | ---- ---- | (I.V.=0.65 dl./g.) | |

[1] Based on 1 P/chain.

The polymer obtained by the above reaction has the general formal (ethyl)₂P-polybutadiene-Li. This polymer was subjected to a coupling reaction utilizing diethyl adipate. The results of this coupling are also shown in the above table.

EXAMPLE II

The same catalyst was utilized for polymerization of styrene also in cyclohexane as with the previous example. The adduct caused rapid polymerization of styrene and excellent agreement is obtained between $M_n$ and $M_p$ values.

CONDITIONS

Run C: Styrene, 2.79M; Complex, 29.7×10⁻³M.
Run D: Styrene, 0.45M; Complex, 3.12×10⁻³M.

| Sample | Time (min.) | Time (° C.) | Conv. (percent) | M.W.×10⁻³ $M_p$ | $M_n$ calcd. | $M_v$ |
|---|---|---|---|---|---|---|
| C | 13 +36 +87 | 40-105 25 25 | 100 100 52.5 | ---- 9.6 ---- | 9.7 9.7 7.86 | ---- 9.5 ---- |
| D | 29 +61 +68 | 25-27 27 27 | ---- ---- 98.4 | ---- ---- 15.5 (I.V.=0.13 dl./g.) | ---- ---- 14.8 | ---- ---- 14.7 |
| Coupled with Diethyladipate (2=1 RLi) | | | | | | |
| ---- | 30 +30 | 22 40 | ---- ---- | (I.V.=0.17 dl./g.) | | |

EXAMPLE III

A dilithio terminated polybutadiene was prepared by polymerization of butadiene with dilithium 1,4-dilithio-1.1',4.4'-tetraphenylbutane catalyst. Ths in turn was reacted with diethyl chlorophosphine to yield a polymer of polybutadiene terminated on both ends of the chain with a diethyl phosphino group. The polybutadiene had an average molecular weight of 10,300. The subject polymer was then utilized to initiate the block polymerization therewith of acrylonitrile in toluene at room temperature. The resulting three-block polymer had the general structure

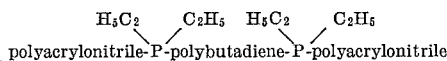

the block molecular weights being 1,350–10,300–1,350.

We claim as our invention:

1. In a polymerization process wherein a hydrocarbon of the group comprising conjugated dienes and vinyl arenes is contacted in hydrocarbon medium at polymerizing temperatures with a polymerization catalyst to provide a polymeric product, the improved catalyst for the polymerization reaction which is an adduct of a chelating amine and an alkali metallo hydrocarbyl phosphide of the general structure:

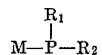

wherein M is an alkali metal ion, $R_1$ is a hydrocarbyl radical and $R_2$ is a radical of the group consisting of $R_1$ and

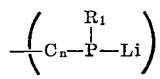

wherein $n$ is a whole integer between 1 and 20.

2. A process according to claim 1 wherein the alpha olefin is a monovinyl arene.

3. A process according to claim 1 wherein the alpha olefin is a conjugated diene.

4. A process according to claim 1 wherein the phosphide is a lithiodialkyl phosphide.

5. A process according to claim 1 wherein the amine is an ethylene poly(dialkylamine).

6. A process according to claim 1 wherein the hydrocarbon monomer is butadiene, the hydrocarbon medium is cyclohexane, the phosphide is lithiodiethyl phosphide and the amine is tetramethylethylene diamine.

7. A process according to claim 1 wherein the metal-terminated polymer so prepared is treated with a coupling agent having at least one site capable of reacting with a carbon to metal bond of the polymer, thereby coupling at least two of the polymer chains terminated with dihydrocarbyl phosphino radicals.

8. A process according to claim 7 wherein the phosphino-terminated coupled polymer is contacted with a copolymerizable acrylate monomer under polymerizing conditions whereby block copolymerization occurs.

9. A polymer having the general configuration:

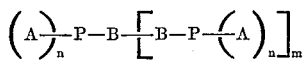

wherein B is a conjugated diene or vinyl arene polymer block, $m$ is an integer from 1 to 5 and each R is an independently selected hydrocarbyl radical, $n$ is a whole number of 0–1 and A is a polymer block of an unsaturated polar monomer copolymerizable therewith.

10. A polymer according to claim 9 having the general formula:

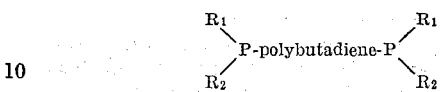

11. A polymer according to claim 9 having the general formula:

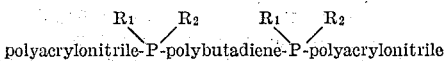

References Cited
UNITED STATES PATENTS

| | | | |
|---|---|---|---|
| 3,281,383 | 10/1966 | Zelinski et al. | 260—23.7 |
| 3,301,840 | 1/1967 | Zelinski et al. | 260—94.2 |
| 3,451,988 | 6/1969 | Langer | 260—94.6 |

JOSEPH L. SCHOFEE, Primary Examiner

R. A. GAITHER, Assistant Examiner

U.S. Cl. X.R.

260—93.5, 94.2, 94.6